(12) United States Patent
Kim et al.

(10) Patent No.: US 9,524,413 B2
(45) Date of Patent: Dec. 20, 2016

(54) APPARATUS AND METHOD FOR RECOGNIZING FINGERPRINT

(71) Applicant: Samsung Electronics Co., Ltd., Gyeonggi-do (KR)

(72) Inventors: Seong-Eun Kim, Gyeonggi-do (KR); Sung-Min Bang, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 14/481,791

(22) Filed: Sep. 9, 2014

(65) Prior Publication Data

US 2015/0071510 A1   Mar. 12, 2015

(30) Foreign Application Priority Data

Sep. 9, 2013   (KR) .................. 10-2013-0108162

(51) Int. Cl.
*G06K 9/00*   (2006.01)

(52) U.S. Cl.
CPC ......... *G06K 9/00013* (2013.01); *G06K 9/0002* (2013.01)

(58) Field of Classification Search
None
See application file for complete search history.

(56) References Cited

U.S. PATENT DOCUMENTS

| | | | | |
|---|---|---|---|---|
| 5,465,714 A | * | 11/1995 | Scheuing | A61B 5/14552 600/323 |
| 6,067,005 A | * | 5/2000 | DeVolpi | G05G 9/047 200/512 |
| 6,597,289 B2 | | 7/2003 | Sabatini | |
| 6,661,631 B1 | * | 12/2003 | Meador | G06K 9/00013 361/93.1 |
| 8,242,482 B2 | | 8/2012 | Hsu et al. | |
| 8,860,689 B2 | | 10/2014 | Zimchoni | |
| 2003/0025606 A1 | | 2/2003 | Sabatini | |
| 2006/0140461 A1 | | 6/2006 | Kim et al. | |
| 2006/0181521 A1 | * | 8/2006 | Perreault | G06F 1/1613 345/173 |
| 2006/0230224 A1 | * | 10/2006 | Yamazaki | G06F 3/0607 711/100 |
| 2006/0233428 A1 | * | 10/2006 | Sakai | G06F 21/32 382/124 |

(Continued)

FOREIGN PATENT DOCUMENTS

| | | |
|---|---|---|
| EP | 2540221 A1 | 1/2013 |
| KR | 10-2011-0114732 | 10/2011 |

OTHER PUBLICATIONS

International Search Report dated Dec. 8, 2014 in connection with International Application No. PCT/KR2014/008417, 3 pages.

(Continued)

*Primary Examiner* — Aaron W Carter (57) ABSTRACT

Disclosed are an apparatus and a method for recognizing a fingerprint, and an electronic device using the same. The electronic device includes: a key button, and a fingerprint recognition sensor unit that is installed at least one portion of the key button, wherein the fingerprint recognition sensor unit includes a circuit board, a fingerprint sensing unit that is installed on a first surface of the circuit board and senses a fingerprint, and a dome switch that is installed on a second surface of the circuit board.

20 Claims, 7 Drawing Sheets

(56) References Cited

U.S. PATENT DOCUMENTS

| | | | |
|---|---|---|---|
| 2008/0042983 A1 | 2/2008 | Kim et al. | |
| 2009/0083847 A1 | 3/2009 | Fadell et al. | |
| 2009/0107824 A1* | 4/2009 | Ou | G06F 3/0202 |
| | | | 200/600 |
| 2011/0254771 A1 | 10/2011 | Zimchoni | |
| 2013/0005303 A1 | 1/2013 | Song et al. | |
| 2013/0120913 A1* | 5/2013 | Petersson | G06F 1/1632 |
| | | | 361/679.01 |
| 2013/0307818 A1* | 11/2013 | Pope | G06F 3/044 |
| | | | 345/174 |
| 2015/0071509 A1* | 3/2015 | Myers | G06K 9/00053 |
| | | | 382/124 |
| 2015/0071510 A1* | 3/2015 | Kim | G06K 9/0002 |
| | | | 382/124 |

OTHER PUBLICATIONS

Written Opinion of International Searching Authority dated Dec. 8, 2014 in connection with International Application No. PCT/KR2014/008417; 7 pages.

* cited by examiner

APPARATUS AND METHOD FOR RECOGNIZING FINGERPRINT

CROSS-REFERENCE TO RELATED APPLICATION(S) AND CLAIM OF PRIORITY

The present application is related to and claims the priority under 35 U.S.C. §119(a) to Korean Application Serial No. 10-2013-0108162, which was filed in the Korean Intellectual Property Office on Sep. 9, 2013, the entire content of which is hereby incorporated by reference.

TECHNICAL FIELD

The present disclosure relates to an apparatus and a method for recognizing a fingerprint, and an electronic device using the same.

BACKGROUND

In recent years, a variety of electronic devices including a portable electronic device, a smart phone, a tablet Personal Computer (PC), a Moving Picture Experts Group audio layer-3 (MP3) player, a Portable Multimedia Player (PMP), and an e-book reader have been provided for users, and the users can access various pieces of content while carrying the electronic devices.

More particularly, various pieces of personal information, particularly, financial information is often stored in the electronic devices. Loss of the electronic devices storing the user's personal information is more likely to lead to secondary damage on account of hacking of the financial information. While a security function using pattern recognition or a password is applied to the electronic devices to prevent it, this is also not free from the hacking.

In order to solve the problems, a user's inherent fingerprint is stored in the electronic devices through a fingerprint recognition apparatus, and when an unrecognized fingerprint is input to the electronic devices, access to the electronic devices is denied, thereby providing an excellent security performance as compared with conventional methods using the pattern recognition or the password.

SUMMARY

The fingerprint recognition apparatus of the electronic device according to the related art includes a fingerprint recognition window such as a display apparatus of an electronic device, and cannot be used for functions other than the function of the fingerprint recognition. Namely, the fingerprint recognition apparatus according to the related art includes the fingerprint recognition window for fingerprint recognition by a user, and therefore, when the fingerprint recognition apparatus is installed in a small-sized electronic device, a degree of freedom of the installation is decreased.

Further, since the fingerprint recognition apparatus is mounted to the small-sized electronic device, the fingerprint recognition apparatus installed outside the electronic device is likely to be damaged when an external impact is applied, and an over-current or heat is generated on account of the damage.

Consequently, a fingerprint recognition apparatus that can be easily installed in the small-sized electronic device, can be used for other functions of the electronic device, and can prevent heating on account of the over-current caused by the damage can be beneficial.

To address the above-discussed deficiencies, it is a primary object to provide a fingerprint recognition apparatus of an electronic device, wherein a fingerprint recognition sensor unit is installed in the electronic device to recognize a user's fingerprint and at the same time, to be used as a key (such as a home key, a side key, or the like), in which case a security function of the electronic device can be further improved by using the fingerprint recognition sensor unit for an additional security authentication function in addition to the existing security authentication function (such as pattern recognition or a password) of the electronic device, a degree of freedom of installation can be increased by installing the fingerprint recognition sensor unit at a location of the existing key, and in addition, the fingerprint recognition sensor unit can be used as a key of the electronic device.

Another aspect of the present disclosure is to provide a fingerprint recognition apparatus of an electronic device, which can prevent heating of the fingerprint recognition apparatus.

Another aspect of the present disclosure is to provide a fingerprint recognition apparatus of an electronic device, which can output a message informing of a failure of the fingerprint recognition apparatus.

In accordance with an aspect of the present disclosure, an electronic device is provided. The electronic device includes: a circuit board, a fingerprint recognition sensor unit coupled to a first surface of the circuit board; and a key button coupled to a second surface of the circuit board and configured to transfer a signal to a controller when an external force is applied to the key button and determine that a push of the key button has occurred when the signal is transferred from the key button.

In accordance with another aspect of the present disclosure, a method of recognizing a fingerprint in an electronic device is provided. The method includes: identifying an over-current in a fingerprint recognition sensor unit of a key button; interrupting power applied to the fingerprint recognition sensor unit after identifying that the over-current has been generated; and outputting a message informing of a failure of the fingerprint recognition sensor unit.

As described above, according to the embodiments of the present disclosure, a fingerprint recognition sensor unit is installed in the electronic device to be used for an additional security authentication function in addition to the existing security authentication function (such as pattern recognition or a password) provided to the electronic device, so that security of the electronic device is maximized and thus a use performance of the electronic device can be improved. In addition, the fingerprint recognition sensor unit is configured as a key in the electronic device to be installed at a location of the existing key, so that a use performance of the fingerprint recognition sensor unit can be improved, a degree of freedom of installation for the fingerprint recognition sensor unit can be increased, and the fingerprint recognition sensor unit can also be used as a key of the electronic device.

Further, according to the embodiments of the present disclosure, the fingerprint recognition apparatus can be prevented from being heated due to a failure thereof.

Further, according to the embodiments of the present disclosure, a failure of the fingerprint recognition apparatus of the electronic device is recognized, and a message informing a user of the failure of the fingerprint recognition apparatus is output, thereby enhancing user convenience.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Various embodiments will now be described more fully with reference to the accompanying drawings in which some example embodiments are illustrated. Meanwhile, the present disclosure is not restricted or limited by the various example embodiments. An identical reference numeral represented in the drawings may denote a member that performs a substantially identical function.

Figure 1:
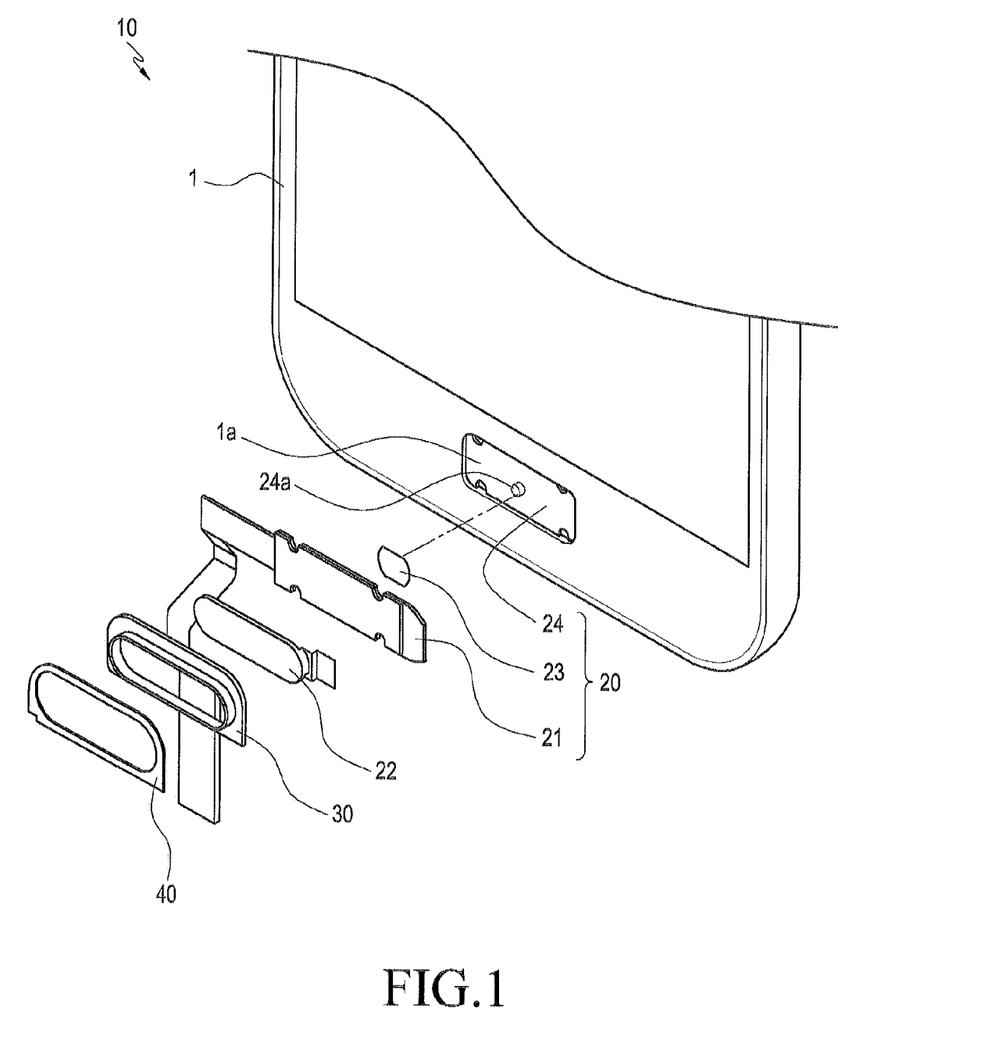
FIG. 1 is a perspective view illustrating a fingerprint recognition apparatus of an electronic device according to an embodiment of the present disclosure.

FIG. 1 is a perspective view illustrating a fingerprint recognition apparatus of an electronic device according to an embodiment of the present disclosure.

Figure 7:
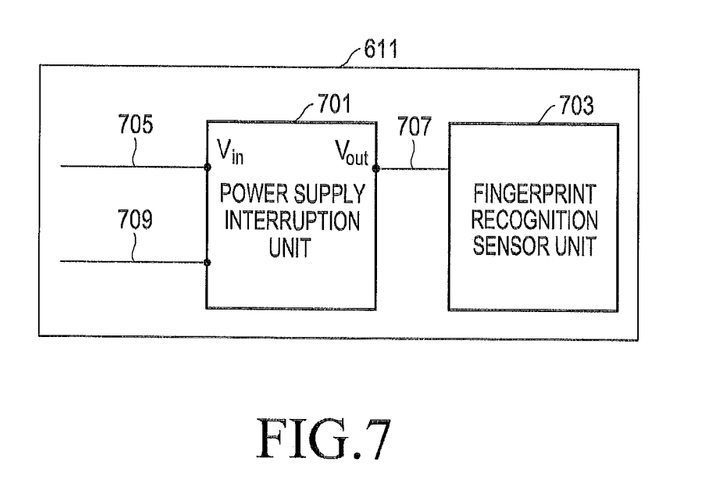
FIG. 7 is a block diagram illustrating a fingerprint recognition sensing unit according to an embodiment of the present disclosure.

Configurations of the fingerprint recognition apparatus of the electronic device 1 according to the present disclosure will be described below with reference to FIG. 1. The fingerprint recognition apparatus 10 can include a fingerprint recognition sensor module 20 and a power supply interruption unit 701 (as illustrated in FIG. 7). The power supply interruption unit 701 can be configured on a circuit board 21.

The fingerprint recognition sensor module 20 can be installed in the electronic device. The fingerprint recognition sensor module 20 can be configured to recognize a user's fingerprint and at the same time can be configured as a key of the electronic device 1. More particularly, the key can be configured as a home key or a side key of the electronic device 1. The fingerprint recognition sensor module 20 can also be configured as another key of the electronic device in addition to the home key or the side key.

In an embodiment of the present disclosure, a home key installed on a front surface of the electronic device can be described as an example of the key.

Although the fingerprint recognition sensor module 20 located on the front surface of the electronic device can be described as an example, the fingerprint recognition sensor module 20 is not limited thereto. Namely, the fingerprint recognition sensor module 20 can be installed on a rear surface or side surface in addition to the front surface of the electronic device 1, and can also be installed at various locations of the electronic device 1.

A fingerprint sensing unit 22 can be configured with any one of a swipe type or an area type fingerprint sensing unit. The fingerprint sensing unit 22 can also be configured with another type sensor, which senses a user's fingerprint, as well as the swipe type or the area type fingerprint sensing units.

The swipe type fingerprint sensing unit can be configured to sense a user's fingerprint when a user's finger glides on the sensing unit, and the area type fingerprint sensing unit can be configured to sense a user's fingerprint when a user touches his finger to the sensing unit.

In an embodiment, the swipe type fingerprint sensing unit can be employed for the fingerprint sensing unit 22.

The fingerprint recognition sensor module 20 can be installed at a location of the existing home key, and at the same time, can additionally be used as a home key so that the fingerprint recognition sensor unit 10 can be easily installed in the electronic device 1 and can perform a security function as well as an original function of the home key of the electronic device 1.

As illustrated in FIG. 1, the fingerprint recognition sensor module 20 can also include a dome switch 23, a key positioning part 24, and the circuit board 21. Furthermore, as illustrated in FIG. 1, the fingerprint recognition apparatus 10 can also include a home-key deco part 30, or a poron part 40. Additionally, as illustrated in FIG. 1, the key positioning part 24 can include a home-key positioning recess 1a or pressing part 24a.

The electronic device 1 according to an embodiment of the present disclosure can include all information and communication equipment, multimedia equipment, or application equipment, including a Portable Multimedia Player (PMP), a Moving Picture Experts Group audio layer-3 (MP3) player, a navigation system, a game machine, a notebook computer, a net-book computer, an advertising board, a television (TV), a Digital Multimedia Broadcasting (DMB) player, a Personal Digital Assistant (PDA), or a smart phone, as well as all mobile communication terminals and portable communication equipment that can operate based on communication protocols corresponding to various communication systems.

Hereinafter, configurations of the fingerprint recognition sensor module 20 will be described more specifically below.

Figure 2:
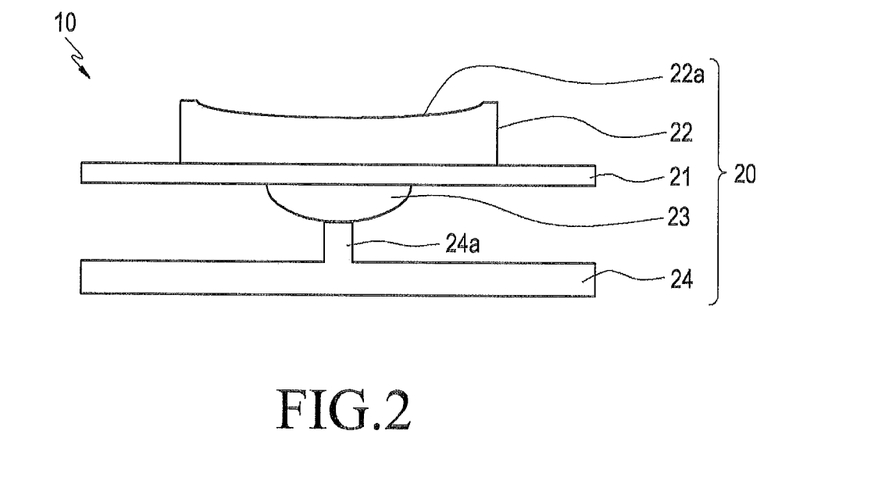
FIG. 2 is a side view illustrating a home key of the fingerprint recognition apparatus of the electronic device according to an embodiment of the present disclosure.
Figure 3:
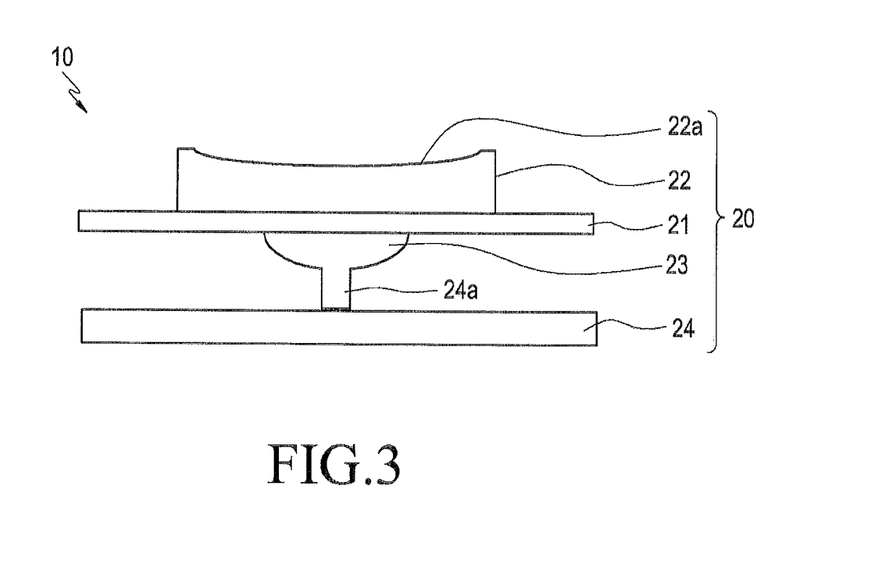
FIG. 3 is a side view illustrating a home key of the fingerprint recognition apparatus of the electronic device according to another embodiment of the present disclosure.

FIG. 2 is a side view illustrating a home key of the fingerprint recognition apparatus 10 of the electronic device 1 according to an embodiment of the present disclosure, and FIG. 3 is a side view illustrating a home key of the fingerprint recognition apparatus 10 of the electronic device 1 according to another embodiment of the present disclosure.

Referring to FIG. 2, the fingerprint recognition sensor module 20 can include a circuit board 21, the fingerprint sensing unit 22, or a dome switch 23. The circuit board 21 can be disposed between the fingerprint sensing unit 22 and the dome switch 23 to be electrically connected with the fingerprint sensing unit 22 or the dome switch 23 which will be described below. The fingerprint sensing unit 22 can be installed on a front surface of the circuit board 21 to detect a user's fingerprint. The dome switch 23 can be installed on a rear surface of the circuit board 21 to be used as the home key. A key positioning part 24 can be disposed below the dome switch 23 and can support the dome switch 23 such that the dome switch 23 can be pressed according to a push of the fingerprint sensing unit 22.

A pressing part 24a can be formed on the key positioning part 24. The pressing part 24a can face the dome switch 23, and press the dome switch 23 when the fingerprint sensing unit 22 is pushed.

The pressing part 24a can be formed of a pressing protrusion. The pressing protrusion protrudes from a top surface of the key positioning part 24, and contacts a bottom surface of the dome switch. The pressing part 24a can be formed of other types of protrusions in a convex form in addition to the above-described pressing protrusion.

In this way, the pressing part 24a can protrude from the key positioning part 24 such that the pressing part 24a presses the dome switch 23 and at the same time, the dome switch 23 can be electrically connected to an electrical contact (not illustrated) provided on the circuit board 21, thereby generating a signal. The generated signal can be applied to a controller of the electronic device 1 to be used as a function of the home key of the electronic device 1.

A pressing part according to another embodiment of the present disclosure will be described more specifically with reference to FIG. 3.

FIG. 3 is a side view illustrating a pressing part 24a according to the other embodiment of the present disclosure.

Referring to FIG. 3, the pressing part 24a can protrude from a bottom surface of the dome switch 23, and can contact a top surface of the key positioning part 24.

That is, the pressing part 24a does not protrude from the key positioning part 24 but from the dome switch 23. When the fingerprint sensing unit 22 is pushed, the pressing part 24a can apply pressure to the dome switch 23 such that the dome switch 23 is pressed.

Accordingly, as the pressing part 24a protrudes from the dome switch 23, a function of the pressing part 24a can be improved and the home key of the electronic device can be more effectively used.

As illustrated in FIG. 1, a home-key deco part 30 can be installed on a front surface of the fingerprint sensing unit 22. A poron part 40 can be installed on a front surface of the home-key deco part 30 to obstruct humidity introduced into the fingerprint recognition sensor module 20.

In addition, a coating layer (not illustrated) can be provided on a surface of the fingerprint sensing unit 22 and configured to maintain fingerprint recognition detection of the fingerprint recognition sensor module 20 and at the same time, to make an external appearance of the fingerprint sensing unit 22 appealing. Namely, the coating layer (not illustrated) can be formed of an Ultraviolet (UV) coating layer, and can be formed of various color coating layers.

Accordingly, the surface of the fingerprint sensing unit 22 can have various colors through the coating layer.

Further, the coating layer can have a thickness of 50 μm to maintain a capability to recognize a user's fingerprint. The coating layer can have a thickness of 50 μm or larger, or 50 μm or smaller, as long as the capability to recognize the user's fingerprint can be maintained.

Figure 4:
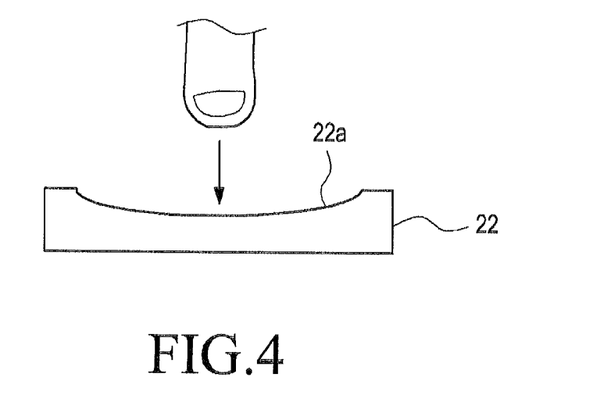
FIG. 4 is a front view illustrating an in-use status of the fingerprint recognition apparatus of the electronic device according to the embodiment of the present disclosure.
Figure 5:
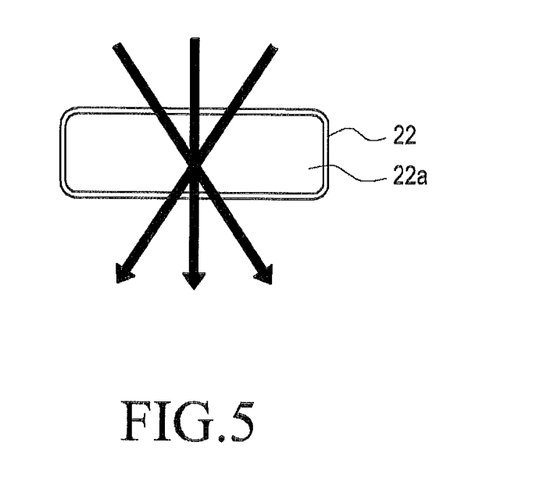
FIG. 5 is a top view illustrating an in-use status of the fingerprint recognition apparatus of the electronic device according to the embodiment of the present disclosure.

In addition, as illustrated in FIGS. 4 and 5, a guide part 22a can be formed on a surface of the fingerprint sensing unit 22 such that the recognition of the user's fingerprint can be easily performed. The guide part 22a can be formed in a shape of a concave recess. The guide part 22a can guide a user's finger for acquisition of a user's fingerprint image.

That is, as illustrated in FIG. 4, a central portion of the guide part 22a can be recessed toward the fingerprint sensing unit 22, so that the fingerprint sensing unit 22 can detect the user's fingerprint even when the user's finger is inclined with respect to a center line of the fingerprint sensing unit 22, as well as when the user's finger is aligned with the center line.

Accordingly, as illustrated in FIG. 5, the guide part 22a can make the user's fingerprint detected at various angles, thereby preventing the fingerprint sensing unit 22 from misrecognizing the fingerprint, and improving a function of the fingerprint recognition apparatus.

Hereinafter, an operation of the fingerprint recognition apparatus and an operation of a circuit will be described more specifically.

As illustrated in FIG. 1, in an assembly process of the fingerprint recognition apparatus 10, the fingerprint recognition apparatus 10 can be configured with the fingerprint recognition sensor module 20 installed in the electronic device 1, or the fingerprint recognition sensor module 20 can include the circuit board 21, the fingerprint sensing unit 22, and the dome switch 23. The fingerprint sensing unit 22 can be installed on the front surface of the circuit board 21, or the dome switch 23 can be installed on the rear surface of the circuit board 21. The dome switch 23 can be installed on a front side of the key positioning part 24. At this time, the dome switch 23 can be installed to correspond to the pressing part 24a formed on the key positioning part 24. The home-key deco part 30 can be installed on the front surface of the fingerprint sensing unit 22, or the poron part 40 can be installed on the front surface of the home-key deco part 30. The fingerprint recognition apparatus 10 assembled as described above can be mounted to a home-key positioning recess 1a formed on the front surface of the electronic device 1.

When a user, in this state, places a user's finger on the fingerprint sensing unit 22 of the fingerprint recognition sensor module 20 and glides the finger from top to bottom or from bottom to top of the fingerprint sensing unit 22, the fingerprint sensing unit 22 can detect the user's fingerprint. The fingerprint sensing unit 22 can generate a fingerprint image by imaging the detected fingerprint, and can transmit the generated fingerprint image to the controller of the electronic device. The controller can compare the transmitted fingerprint image with a user's fingerprint stored in advance, and can recognize the user based on the result of the comparison. Hereinafter, an operation of the electronic device will be described with reference to FIG. 6 through FIG. 10.

Figure 6:
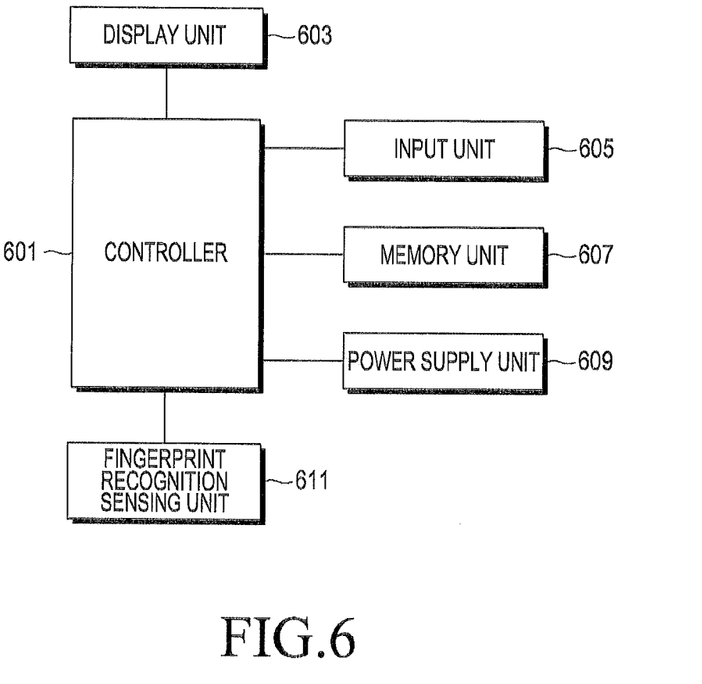
FIG. 6 is a block diagram illustrating an electronic device according to an embodiment of the present disclosure.

FIG. 6 is a block diagram illustrating an electronic device according to an embodiment of the present disclosure.

Referring to FIG. 6, the electronic device can include a controller 601, a display unit 603, an input unit 605, a memory unit 607, a power supply unit 609, or a fingerprint recognition sensing unit 611.

The input unit 605 can include keys for inputting number and character information and function keys for setting various functions. The display unit 603 can display an image signal on a screen, and can display data that the controller 601 requests to output. When the display unit 603 is implemented with a capacitive or pressure sensitive touch screen, the input unit 605 can include minimum keys set in advance, and the display unit 603 can substitute some of key input functions of the input unit 605.

The memory unit 607 can include a program memory and data memory. The program memory can store a booting system and an operating system (hereinafter, referred to as 'OS') for controlling a general operation of the electronic device, and the data memory can store various data generated during the operation of the electronic device. The power supply unit 609 can include a battery that supplies electrical power to various components of the electronic device according to the control of the controller 601, and can perform a function of applying the electrical power output from the battery to the various components.

The fingerprint recognition sensing unit 611 can perform a function of recognizing a fingerprint input by a user.

FIG. 7 is a block diagram illustrating a fingerprint recognition sensing unit 611 according to an embodiment of the present disclosure. Referring to FIG. 7, the fingerprint recognition sensing unit 611 can include a fingerprint recognition sensor unit 703 and a power supply interruption unit 701. The fingerprint recognition sensor unit 703 can also include a fingerprint sensor included in the fingerprint sensing unit 22 and a related circuit.

The fingerprint recognition sensor unit 703 can recognize a fingerprint input by a user to generate a fingerprint image. The power supply interruption unit 701 can include a power line 705 connected with the power supply unit 609, a power line 707 connected with the fingerprint recognition sensor unit 703, a control line 709 through which a signal can be outputted to the controller 601, and a control line through which a signal can be received from the controller 601. The power lines 705 and 707 can correspond to lines for supplying electrical power to the fingerprint recognition sensor unit 703.

The power supply interruption unit 701 can interrupt supply of power applied to the fingerprint recognition sensor unit when an over-current is applied to the fingerprint recognition sensor unit. For example, the power supply interruption unit 701 can measure a current of the power applied to the fingerprint recognition sensor unit 703. For example, the power supply interruption unit 701 can measure a current in the power line 707, which is applied to the fingerprint recognition sensor unit 703.

The power supply interruption unit 701 can identify whether the measured current value is a predetermined reference value or higher. The predetermined reference value can refer to a value that has been determined to identify whether an over-current is applied to the fingerprint recognition sensor unit 703 due to damage of the fingerprint recognition sensor unit 703. For example, the predetermined reference value can be 100 mA.

When the measured current value is the predetermined reference value or higher, the power supply interruption unit 701 can transmit a power supply interruption signal to the controller 601, and thus the power supply interruption signal representing that supply of power to the fingerprint recognition sensor unit 703 can be interrupted. For example, the power supply interruption unit 701 can transmit the power supply interruption signal to the controller 601 through the control line 709.

The power supply interruption unit 701 can interrupt the power applied to the fingerprint recognition sensor unit 703. For example, the power supply interruption unit 701 can switch off the power line 707 through which the power is applied to the fingerprint recognition sensor unit 703, by using a switch, and thus can interrupt the power.

The controller 601 can perform a function of controlling an overall operation of the electronic device. For example, the controller 601 can identify whether the power supply interruption signal is received from the fingerprint recognition sensing unit 611. For example, the controller 601 can receive the power supply interruption signal through the control line 709.

When the power supply interruption signal is received, the controller 601 can interrupt the power applied to the fingerprint recognition sensing unit 611. For example, the controller 601 can switch off the power line 705 by using a switch to interrupt the power applied to the fingerprint recognition sensor unit 703. As another example, the controller 601 can switch off the power line for supplying electrical power to the fingerprint recognition sensor unit 703 and the power supply interruption unit 701, and thus can interrupt the power applied to the fingerprint recognition sensing unit 611.

Figure 10:
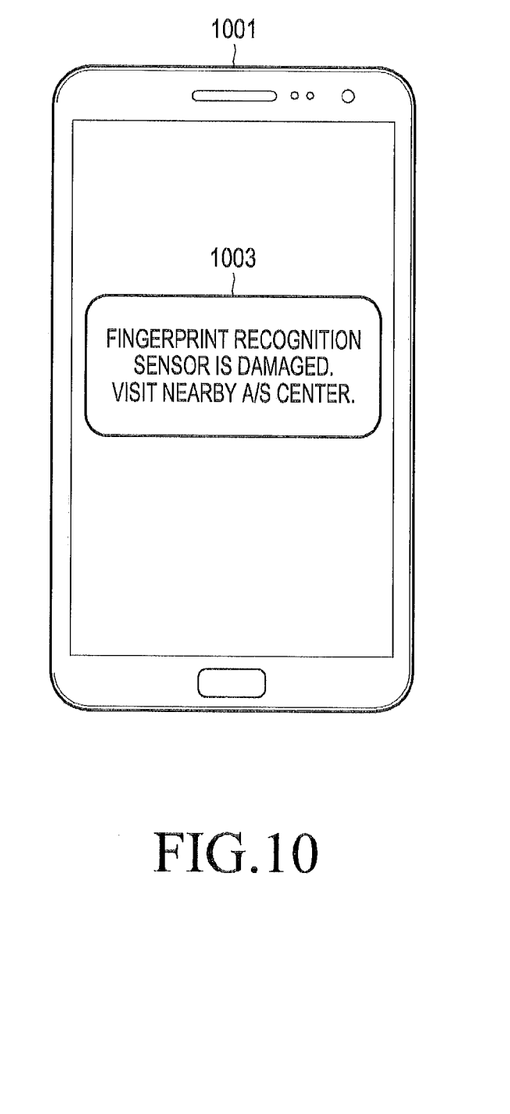
FIG. 10 illustrates a screen on which a message informing of a failure of a fingerprint recognition sensor unit is output according to an embodiment of the present disclosure.

An electronic device 1001 including a controller (such as controller 601 as illustrated in FIG. 6) and a fingerprint recognition unit (such as fingerprint recognition unit 703 illustrated in FIG. 7) can generate a message informing of a failure of the fingerprint recognition sensor unit 703, and may output the generated message. For example, as illustrated in FIG. 10, the electronic device 1001, via a controller, can display a popup window including a text informing of the failure of the fingerprint recognition sensor unit. As another example, electronic device 1001, via a controller, can output a message informing of the failure of a fingerprint recognition sensor unit through a sound processing unit (not illustrated).

The electronic device 1001, via a controller, can identify whether a function of fingerprint recognition is requested to be executed. The function of the fingerprint recognition can be executed for security of the electronic device. For example, the function of the fingerprint recognition can be requested when the electronic device enters a standby status from a sleep status according to a user's request, or when a specific application is executed by a user. The specific application can refer to a high security application, and for example, can be an application related to electronic finance or personal information.

When the function of the fingerprint recognition is requested to be executed, the electronic device 1001, via a controller, can generate a message informing of a failure of a fingerprint recognition sensor unit, and can output the generated message. For example, as illustrated in FIG. 10, the electronic device 1001, via a controller, can display a popup window 1003 including a text informing of the failure of the fingerprint recognition sensor unit. As another example, the electronic device 1001, via a controller, can output a message informing of the failure of the fingerprint recognition sensor unit through a sound processing unit (not illustrated).

Figure 8:
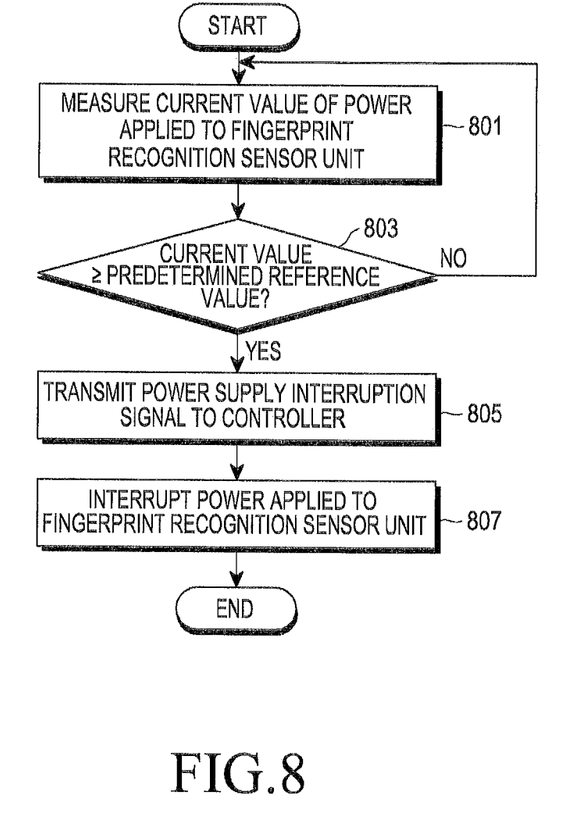
FIG. 8 is a flowchart illustrating a process through which a power supply interruption unit according to an embodiment of the present disclosure interrupts power.

FIG. 8 is a flowchart illustrating a process through which a power supply interruption unit according to an embodiment of the present disclosure interrupts power.

Referring to FIG. 8, in step 801, a power supply interruption unit 701 can measure a current value of power applied to a fingerprint recognition sensor unit 703, and thereafter can proceed to step 803. For example, the power supply interruption unit 701 can measure a current in a power line 707, which can be applied to the fingerprint recognition sensor unit 703.

In step 803, the power supply interruption unit 701 can identify whether the measured current value is a predetermined reference value or higher. The predetermined reference value can refer to a value that has been determined to identify whether an over-current is applied to the fingerprint recognition sensor unit 703 due to damage of the fingerprint recognition sensor unit 703. For example, the predetermined reference value can be 100 mA.

If the measured current value is the predetermined reference value or higher, the power supply interruption unit 701 can proceed to step 805, and if the measured current value is not the predetermined reference value or higher, the power supply interruption unit 701 can repeatedly perform the step 801.

In step 805, the power supply interruption unit 701 can transmit, for example, to a controller 601, a power supply interruption signal representing that supply of the power to the fingerprint recognition sensor unit 703 has been interrupted, and thereafter can proceed to step 807. For example, the power supply interruption unit 701 can transmit the power supply interruption signal to the controller 601 through a control line 709.

In step 807, the power supply interruption unit 701 can interrupt the power applied to the fingerprint recognition sensor unit 703. For example, the power supply interruption unit 701 can switch off the power line 707 through which the power is applied to the fingerprint recognition sensor unit 703, by using a switch, and thus can interrupt the power.

Figure 9:
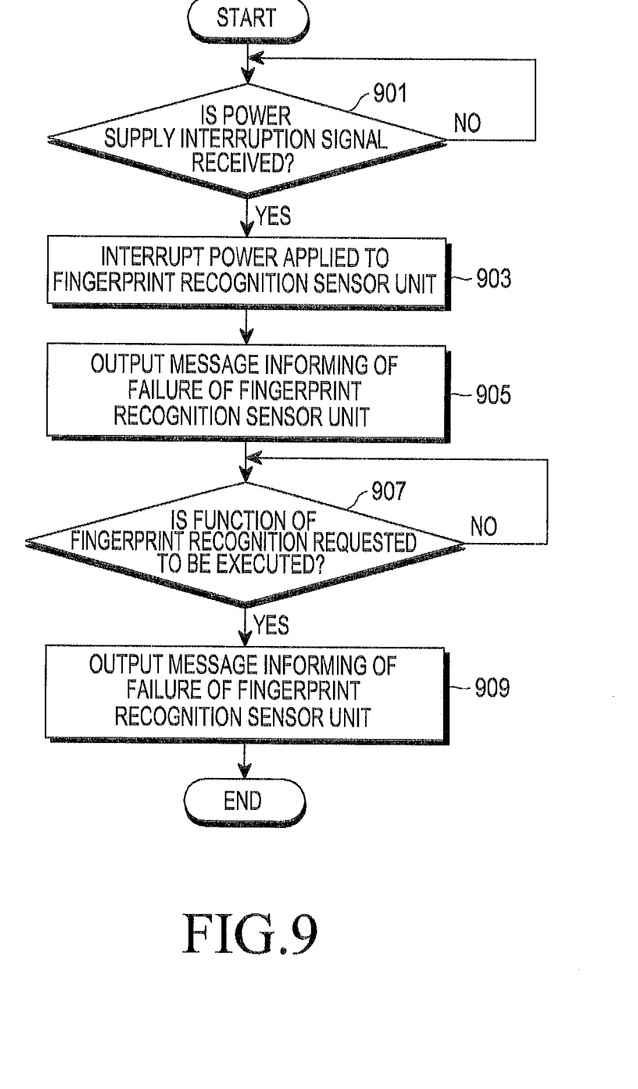
FIG. 9 is a flowchart illustrating a process through which a controller according to an embodiment of the present disclosure outputs a message informing of a failure of the fingerprint recognition sensor unit.

FIG. 9 is a flowchart illustrating a process through which a controller according to an embodiment of the present disclosure can output a message informing of a failure of the fingerprint recognition sensor unit.

Referring to FIG. 9, in step 901, a controller 601 can identify whether a power supply interruption signal is received from a fingerprint recognition sensing unit 611. For example, when the controller 601 is connected with a power supply interruption unit 701 of the fingerprint recognition sensing unit 611 through a control line 709, the controller 601 can receive the power supply interruption signal through the control line 709. Here, the power supply interruption signal can refer to a signal representing that power applied to a fingerprint recognition sensor unit 703 has been interrupted.

If the power supply interruption signal is received, the controller 601 can proceed to step 903, and if the power supply interruption signal is not received, the controller 601 can proceed to step 901.

In step 903, the controller 601 can interrupt the power applied to the fingerprint recognition sensing unit 611, and thereafter can proceed to step 905. For example, the controller 601 can switch off a power line 705, through which the power is applied to the fingerprint recognition sensing unit 611, by using a switch, thereby interrupting the power applied to the fingerprint recognition sensor unit 703. As another example, the controller 601 can switch off a power line for supplying electrical power to the fingerprint recognition sensor unit 703 and the power supply interruption unit 701, and thus can interrupt the power applied to the fingerprint recognition sensing unit 611.

In step 905, the controller 601 can generate a message informing of a failure of the fingerprint recognition sensor unit 703, output the generated message, and then can proceed to step 907. For example, as illustrated in FIG. 10, the electronic device 1001, via a controller, (such as control 601 illustrated in FIG. 6) can display a popup window including a text informing of the failure of the fingerprint recognition sensor unit 703. As another example, the electronic device 1001, via a controller, can output a message informing of the failure of the fingerprint recognition sensor unit 703 through a sound processing unit (not illustrated).

In step 907, the controller 601 can identify whether a function of fingerprint recognition is requested to be executed. The function of the fingerprint recognition can be executed for security of the electronic device. For example, the function of the fingerprint recognition can be requested when the electronic device enters a standby status from a sleep status according to a user's request, or when a specific application is executed by a user. The specific application can refer to a high security application, and for example, can be an application related to electronic finance or personal information.

If the function of the fingerprint recognition is requested to be executed, the controller 601 can proceed to step 909, and if the function of the fingerprint recognition is not requested, the controller 601 can repeatedly perform the step 907.

In step 909, the controller 601 can generate a message informing of a failure of the fingerprint recognition sensor unit 703, and can output the generated message. For example, as illustrated in FIG. 10, the electronic device 1001, via a controller can display a popup window 1003 including a text informing of the failure of the fingerprint recognition sensor unit 703. As another example, a controller 601 can output a message informing of the failure of the fingerprint recognition sensor unit 703 through a sound processing unit (not illustrated).

FIG. 10 illustrates a screen on which a message informing of a failure of a fingerprint recognition sensor unit is output according to an embodiment of the present disclosure.

Referring to FIG. 10, an electronic device 1001 can display a popup window 1003 including a text informing of a failure of a fingerprint recognition sensor unit 703, in a case in which a power supply interruption signal is received, or a function of fingerprint recognition is requested to be executed after the power supply interruption signal is received.

The fingerprint recognition apparatus and method of the present disclosure may be implemented as a computer readable code in a computer readable recording medium. The computer-readable recording medium includes all the types of recording devices in which data readable by a computer system are stored. As for such a recording medium, for example, a ROM, a RAM, an optical disc, a magnetic tape, a floppy disc, a hard disc, or a non-volatile memory may be used, and a medium implemented in a type of carrier wave (for example, transmission through the Internet) may also be included in such a recording medium. In addition, the computer-readable recording medium may be stored with codes which are distributed in computer systems connected by a network such that the codes can be read and executed by a computer in a distributed method.

It is apparent to those skilled in the art to which the present disclosure pertains that the above-described fingerprint recognition apparatus and method of the present disclosure are not restricted by the above-described embodiments and drawings, and various substitutions, modifications and changes can be made without departing from the scope of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a circuit board;
a fingerprint recognition sensor unit coupled to a first surface of the circuit board; and
a key button coupled to a second surface of the circuit board and configured to transfer a signal to a controller when an external force is applied to the key button and determine that a push of the key button has occurred when the signal is transferred from the key button,
wherein the key button comprises a key positioning unit including a pressing part, and
wherein the pressing part is formed of a pressing protrusion configured to protrude from a top surface of the key positioning unit and contact a second surface of a dome switch electrically connected to a second surface of the circuit board when an external force is applied to the key button.

2. The electronic device of claim 1, wherein the fingerprint recognition sensor unit includes a concave surface.

3. The electronic device of claim 1, further comprising;
a power supply interruption unit configured to interrupt power applied to the fingerprint recognition sensor unit and transmit a power supply interruption signal representing that the power applied to the fingerprint recognition sensor unit has been interrupted when an over-current is generated in the fingerprint recognition sensor unit.

4. The electronic device of claim 3, wherein the controller is configured to switch off a power line of the fingerprint recognition sensor unit and output a message informing of a failure of the fingerprint recognition sensor unit when the power supply interruption signal is received.

5. The electronic device of claim 3, wherein the controller is configured to output a message informing of a failure of the fingerprint recognition sensor unit when a function of fingerprint recognition using the fingerprint recognition sensor unit is requested.

6. The electronic device of claim 1, wherein the key button comprises at least one of a home key and a side key of the electronic device.

7. The electronic device of claim 1, wherein the fingerprint recognition sensor unit is formed of at least one of a swipe type fingerprint recognition sensor or an area type fingerprint recognition sensor.

8. The electronic device of claim 1, further comprising a home-key deco part coupled to a front surface of the fingerprint recognition sensor unit and a urethane part coupled to a front surface of the home-key deco part, wherein the home-key deco part is configured to protect the fingerprint recognition sensor unit, and wherein the urethane part is configured to obstruct humidity introduced into the fingerprint recognition sensor unit.

9. A method of operating an electronic device comprising:
identifying an over-current in a fingerprint recognition sensor unit of a key button;
interrupting power applied to the fingerprint recognition sensor unit after identifying that the over-current has been generated; and
outputting a message informing of a failure of the fingerprint recognition sensor unit,
wherein the key button comprises a key positioning unit including a pressing part, and
wherein the pressing part is formed of a pressing protrusion configured to protrude from a top surface of the key positioning unit and contact a second surface of a dome switch electrically connected to a second surface of a circuit board when an external force is applied to the key button.

10. The method of claim 9, further comprising:
outputting a message informing of a failure of the fingerprint recognition sensor unit when a function of fingerprint recognition using the fingerprint recognition sensor unit is requested,
wherein the fingerprint recognition sensor unit includes concave surface.

11. A method of operating an electronic device comprising:
identifying an over-current in a fingerprint recognition sensor unit of a key button; and
outputting a message informing of a failure of the fingerprint recognition sensor unit after identifying that the over-current has been generated,
wherein the key button comprises a key positioning unit including a pressing part, and
wherein the pressing part is formed of a pressing protrusion configured to protrude from a top surface of the key positioning unit and contact a second surface of a dome switch electrically connected to a second surface of a circuit board when an external force is applied to the key button.

12. The method of claim 11, further comprising interrupting power applied to the fingerprint recognition sensor unit,
wherein the fingerprint recognition sensor unit includes concave surface.

13. The method of claim 11, further comprising:
outputting a message informing of a failure of the fingerprint recognition sensor unit when a function of fingerprint recognition using the fingerprint recognition sensor unit is requested.

14. The method of claim 12, further comprising interrupting power applied to the fingerprint recognition sensor unit after identifying that the over-current has been generated.

15. The method of claim 12, further comprising generating a power supply interruption signal representing that the power applied to the fingerprint recognition sensor has been interrupted.

16. The method of claim 12, further comprising switching off a power line of the fingerprint recognition sensor unit when a power supply interruption signal is received.

17. The method of claim 9, further comprising generating a power supply interruption signal representing that the power applied to the fingerprint recognition sensor has been interrupted.

18. The method of claim 17, further comprising switching off a power line of the fingerprint recognition sensor unit when a power supply interruption signal is received.

19. The electronic device of claim 1, wherein the fingerprint recognition sensor unit is configured to detect a user's fingerprint at a plurality of angles.

20. The electronic device of claim 1, further comprising an ultraviolet coating disposed on top of the fingerprint recognition sensor unit.

* * * * *